(12) United States Patent
Arnan et al.

(10) Patent No.: US 7,281,106 B1
(45) Date of Patent: Oct. 9, 2007

(54) METHOD AND APPARATUS FOR SELECTIVE VOLUME SWAPPING IN A DATA STORAGE DEVICE BASED ON MERGING MULTIPLE SETS OF CANDIDATE STORAGE DEVICES

(75) Inventors: Ron Arnan, Brookline, MA (US); Hui Wang, Upton, MA (US); Tao Kai Lam, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 339 days.

(21) Appl. No.: 11/087,113

(22) Filed: Mar. 23, 2005

(51) Int. Cl.
*G06F 12/00* (2006.01)
(52) U.S. Cl. ...................... 711/165; 711/112
(58) Field of Classification Search ............. None
See application file for complete search history.

(56) References Cited

U.S. PATENT DOCUMENTS

| | | | |
|---|---|---|---|
| 6,189,071 B1 | 2/2001 | Bachmat | |
| 6,341,333 B1 | 1/2002 | Schreiber et al. | |
| 6,405,282 B1 | 6/2002 | Lam et al. | |
| 6,415,372 B1 | 7/2002 | Zakai et al. | |
| 6,442,650 B1 | 8/2002 | Bachmat et al. | |
| 6,480,930 B1 | 11/2002 | Zakai et al. | |
| 6,557,074 B1 | 4/2003 | Michel et al. | |
| 6,584,545 B2 | 6/2003 | Bachmat et al. | |
| 6,601,133 B2 | 7/2003 | Zakai et al. | |
| 6,611,896 B1 | 8/2003 | Mason, Jr. et al. | 711/114 |
| 6,614,616 B1 | 9/2003 | Michel et al. | 360/78.04 |
| 6,622,221 B1 | 9/2003 | Zahavi | 711/154 |
| 6,664,964 B1 | 12/2003 | Levin-Michael et al. | |
| 6,665,771 B1 | 12/2003 | Michel et al. | |
| 6,671,774 B1 | 12/2003 | Lam et al. | |
| 6,675,274 B1 | 1/2004 | Lam et al. | |
| 6,694,405 B2 | 2/2004 | Lam et al. | |
| 6,711,649 B1 | 3/2004 | Bachmat et al. | |
| 6,715,039 B1 | 3/2004 | Michael et al. | 711/133 |
| 6,721,870 B1 | 4/2004 | Yoachai et al. | 711/204 |
| 6,728,840 B1 | 4/2004 | Shatil et al. | 711/137 |
| 6,804,733 B1 | 10/2004 | Michel et al. | |

*Primary Examiner*—Reginald Bragdon
*Assistant Examiner*—Ngoc Dinh
(74) *Attorney, Agent, or Firm*—BainwoodHuang

(57) ABSTRACT

In an optimization dispatch process for a storage system, M storage devices are identified for an optimization analysis process to be executed to identify logical volume swaps for improving system performance. The M storage devices are identified by merging candidate storage devices obtained from separate identification algorithms employing distinct identification criteria. The analysis process is dispatched for execution based on the M storage devices until (i) a successful completion upon which a best swap has been identified, or (ii) a resource-based stop condition such as an execution time limit. M is adjusted for a subsequent iteration such that over time a desired rate of successful completions is achieved. For example, M is increased by a first amount upon a successful completion and decreased by a second amount upon the stop condition. A variety of identification algorithms can be employed, including an algorithm based on assigning swap scores to the storage devices during relatively short sample intervals.

14 Claims, 5 Drawing Sheets

METHOD AND APPARATUS FOR SELECTIVE VOLUME SWAPPING IN A DATA STORAGE DEVICE BASED ON MERGING MULTIPLE SETS OF CANDIDATE STORAGE DEVICES

BACKGROUND

The present invention is related to the field of data storage systems.

The performance of data storage systems typically depends in part on the arrangement or configuration of the stored data. For example, data items that are heavily utilized are often distributed among multiple storage devices in the system to avoid "bottlenecks", i.e., devices that have long service times for data accesses because of the quantity of requests they receive. System performance is generally improved when different file systems and databases that receive heavy concurrent use are stored on different storage devices within the system.

There are known techniques for improving storage system performance by selectively moving stored data within a system in a manner calculated to reduce the service times provided by devices within the system. In one such technique, statistical data is collected regarding the input/output (I/O) accesses to logical volumes stored on storage devices within a storage system. This data is aggregated over many sub-intervals to obtain a measure of average service time for each storage device within the system over a measurement interval that may span several days or longer. Using an exhaustive search, a pair of candidate storage devices and one or more pairs of potentially exchangeable logical volumes are then identified. Further processing is then performed to determine whether the service times of the storage devices can be improved by exchanging the logical volumes of one or more of the pairs between the two drives, i.e., by moving each volume of the pair from its present storage device to the other storage device. In particular, it is determined whether the service time of the more heavily loaded storage device will be reduced, and the service time of the less heavily loaded storage device will not be increased unduly, if the exchange of logical volumes is performed. If it is determined that exchanging the logical volumes will result in a substantial improvement in performance, a swap operation is performed to actually carry out the exchange. This process can also be run on a single candidate storage device where the exchanging of logical volumes occurs on a single disk based on whether the service time of the storage device will be reduced. This process is repeated at periodic analysis intervals to enable the system to continuously adjust to changing workloads and other factors affecting the pattern of disk activity. A technique which is similar to that described above is provided in U.S. Pat. No. 6,711,649 to Bachmat et al. entitled "Load Balancing on Disk Array Storage Device."

SUMMARY

It has been observed that techniques for exchanging logical volumes, such as described above, consume a central processing unit (CPU) processing resource and an input/output (I/O) processing resource roughly in proportion to the square of the number of storage devices in the system. Thus, as the number of storage devices increases, the utilization of processing resources for just the volume exchange process can become excessive. Viewed another way, for a given amount of processing resources allocated to the volume exchange process, it may not be possible to adequately analyze all of the storage devices to find the best swap(s), which means that the performance of the storage system may be less than optimal insofar as affected by the placement of the logical volumes on the storage devices.

In accordance with the present invention, a technique is disclosed for selecting a subset of storage devices on which an optimization analysis process is performed for optimizing the placement of logical volumes. The selection process picks out with high probability the best candidates for logical volume swaps, such that the overall system performance improvement from the disclosed technique is similar to that obtained from more exhaustive known techniques. Additionally, the size of the subset is automatically adjusted so as to continually make the most effective use of the processing resources allocated to the optimization analysis process.

The disclosed method includes repeated executions of an optimization dispatch process and an optimization analysis process on a processing platform. Each execution of the optimization analysis process includes a search for a corresponding best swap of logical volumes among an identified set of the storage devices according to a predetermined performance criteria. Each execution of the optimization dispatch process includes identifying a set of M storage devices for which the optimization analysis process is to be executed. The M storage devices are identified by (i) obtaining sets of candidate storage devices from a number of separate identification algorithms that employ mutually distinct identification criteria, and (ii) merging the sets of candidate storage devices from the different identification algorithms. Each execution further includes dispatching the optimization analysis process to be executed for the set of M storage devices until the earlier of (i) a successful completion upon which the best swap for the M storage devices has been identified, and (ii) a stop condition upon which the optimization analysis process has used a predetermined quota of processing resources. One example of such a quota is a limit on execution time of the optimization analysis process. If the successful completion occurs, then the identified swap or swaps can be executed in a subsequent swap execution process, leading to the desired improvement in system performance.

The initial value of M is set to the total number of storage device in the storage component. The value of M is then adjusted for a subsequent execution of the optimization dispatch and optimization analysis processes. M is adjusted based on whether the successful completion or the predetermined stop condition has occurred, such that over time a desired rate of successful completions is achieved. In one embodiment, M is increased by a first amount if the successful completion occurs, and decreased by a second amount different from the first amount if the stop condition occurs. In this fashion, the value of M generally converges to a narrow range in which a successful completion occurs at least once every several iterations of the overall process.

A variety of identification algorithms can be employed. In one embodiment, a swap scoring algorithm is utilized in which pairs of swap scores are assigned to respective pairs of the storage devices in each of a plurality of sample intervals. Each swap-score-pair assignment indicates a relative amount of performance improvement of the storage system that would be expected in the sample interval if a best swap of logical volumes were performed between source and target storage devices of the pair of storage devices. The per-sample-interval swap scores are weighted according to respective levels of activity of the storage system, and the weighted swap scores are summed for each storage device over the sample intervals. The storage devices are ranked by the summed swap scores, and a predetermined number of the highest-ranked and lowest-ranked storage devices are selected. Another identification algorithm involves random selection of storage devices, which is desirable to avoid undesirable operating conditions that might arise if only deterministic algorithms are employed.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The entirety of the disclosure of U.S. Pat. No. 6,711,649 to Bachmat et al. entitled "Load Balancing on Disk Array Storage Device," is incorporated by reference herein.

Figure 1:
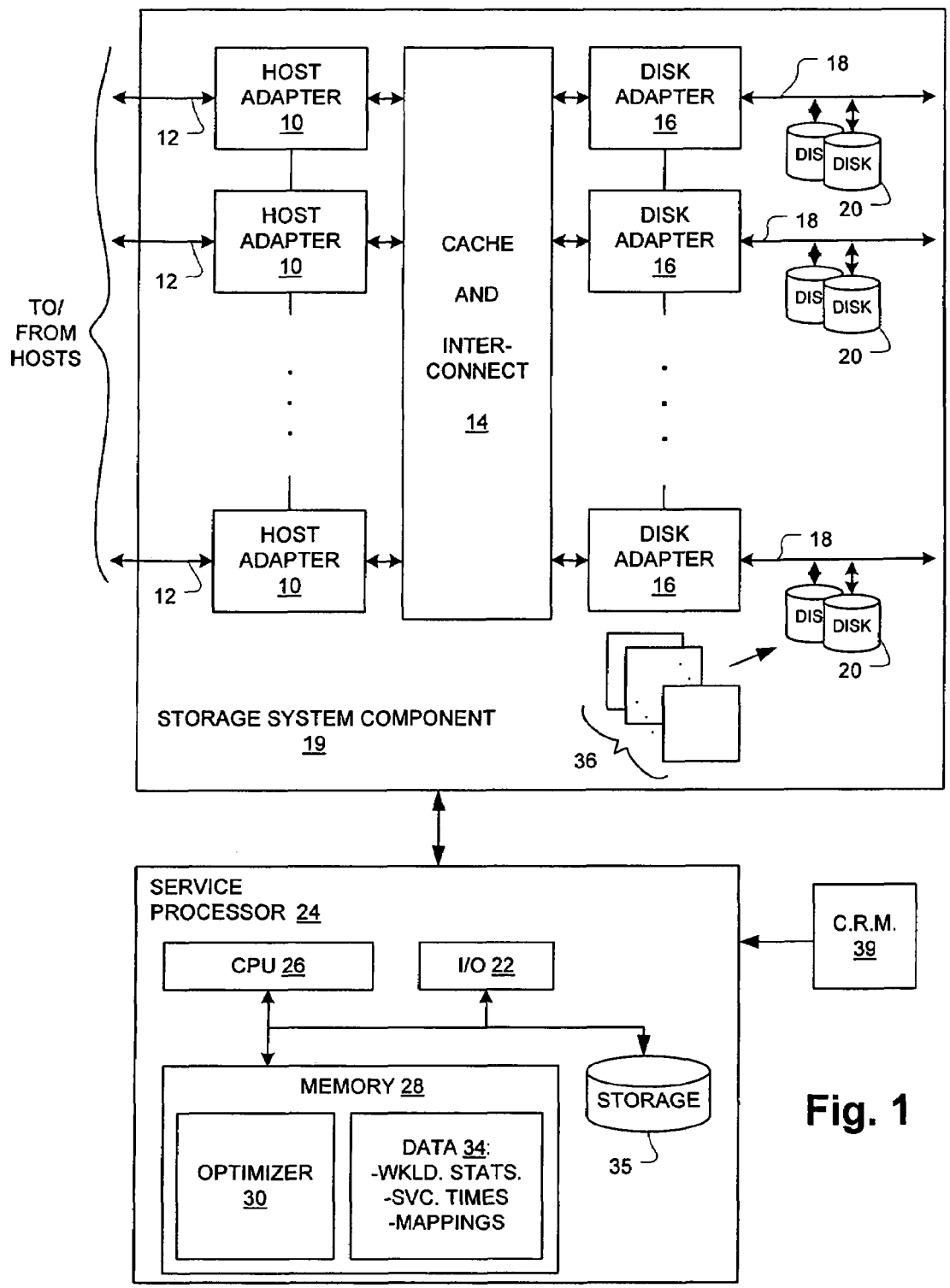
FIG. 1 is a block diagram of a data storage system including a service processor having an optimization program component for performing selective volume swapping in accordance with the present invention.

FIG. 1 shows a data storage system for storing data for a number of host computers (or simply hosts). The host computers are coupled to respective host adapters 10 via respective interconnect buses 12, such as Fiber Channel or other high-speed storage interconnect buses. The host adapters 10 are coupled to cache and interconnect block 14, which in turn is coupled to disk adapters 16. Each disk adapter 16 interfaces to one or more storage buses 18 to which a plurality of storage devices 20 (e.g., disk drives) are connected. The storage buses 18 may be Small Computer System Interconnect (SCSI) buses for example.

In the illustrated embodiment, the above-described components are part of a storage system component 19 that may include a distinct physical housing. An example of such a storage system component is a Symmetrix® storage system sold by EMC Corporation.

The storage system component 19 has an interface to an input/output portion 22 of a service processor 24, which may be for example a personal computer or similar device. The service processor 24 includes a central processor (CPU) 26, a memory 28, and attached local storage 35, which is typically a disk drive. During operation, the memory 28 stores an optimization program including a dispatcher program component 30 and an analyzer program component 32, which have been loaded from the attached storage 35 and are executed by the CPU 26. The memory 28 also stores various data 34, including workload statistics and service times that are calculated as part of the optimization process, and a mapping of logical volumes to physical storage devices. The nature and use of these data are described below. The interface between the storage system component 19 and the service processor 24 permits the service processor 24 to communicate with the host adapters 10 and the disk adapters 16 for a variety of purposes, including gathering workload statistics and swapping logical volumes among the storage devices 20 as described below. The input/output portion 22 also enables the service processor 24 to obtain the optimizer program 30 from a computer-readable medium (CRM) 39 such as a compact disc or other non-volatile storage medium.

It is to be understood that the present invention may be embodied in a processor such as the service processor 24, generally including a memory loaded with program component(s) such as the dispatcher and analyzer program components 30 and 32 that, when loaded into the memory and executed by the processor, cause the processor to implement the functionality described and claimed herein. It also may be embodied in a computer-readable medium on which such program component(s) are stored in a non-volatile manner, for loading into the processor memory and execution. Additionally, in alternative embodiments part or all of the functionality may be performed from within a storage system component such as storage system component 19 or on a host computer for example.

During operation, the host adapters 10 respond to storage requests from the hosts by determining whether the requests can be satisfied from a large cache memory within the cache and interconnect block 14. In the case of host read requests for data found in the cache memory (referred to as "read hits"), the data is read from the cache memory and returned to the requesting host. In the case of host write requests, the data is written into the cache memory and is also provided to an appropriate disk adapter 16 to be stored on one or more of the storage devices 20 as determined by a storage address associated with the data. In the case of host read requests for data not found in the cache memory (referred to as "read misses"), an appropriate disk adapter 16 retrieves the data from one of the storage devices 20 (as determined by the storage address), stores the data in the cache memory, and supplies the data to the host adapter 10 from which the request originated. The requesting host adapter 10 returns the data to the requesting host.

The above operations generally proceed without any involvement of the service processor 24. The service processor 24 is an ancillary device for use in configuring and managing the various resources within the storage system, especially the storage devices 20 and the data stored thereon. In particular, the dispatcher and analyzer program components 30 and 32 of the service processor 24 are used to analyze operation of the storage system to determine whether it is possible to reconfigure the pattern of data storage on the storage devices 20 to improve system performance by reducing the time required to access data, referred to as "service time". The operation of these program components within the data storage system is described in detail below.

Generally, modern storage systems employ data organization constructs referred to as "logical volumes", which are units of storage that are visible to the hosts via the host adapters 10. A set of logical volumes is shown at 36 in FIG. 1. Among other attributes, a logical volume 36 has a size as represented by a range of addresses. A host to which a logical volume 36 is allocated performs input/output (I/O) operations to the logical volume 36 as though it were a distinct physical storage device. The data associated with logical volumes 36 is stored in corresponding areas of the physical storage devices 20, and the storage system maintains a map or translation structure that associates each logical volume 36 with areas on one or more storage devices 20 where data for the logical volume 36 is stored. Examples of these mappings are shown below.

In some cases, a logical volume 36 has a one-to-one mapping to an area of a single storage device 20. When data protection in the form of parity or replication is provided, a given logical volume 36 may be associated with a set of storage areas of multiple storage devices 20. At any given moment, there is a mapping of all logical volumes 36 to corresponding storage devices where the logical volume 36 data are stored. Viewed another way, this mapping also describes, for each storage device 20, the set of logical volumes 36 that are currently stored on it. The logical-to-physical mapping is generally useful for carrying out host read and write requests based on logical volume identifiers accompanying the requests. The reverse (physical-to-logical) mapping assists the analyzer 32 in associating volume-based workload statistics with individual storage devices 20, as described in more detail below. As mentioned above, a data structure representing these mappings is contained within the data 34 of the service processor 24. A simplified example of these two mappings is given in the Tables 1 and 2 below:

TABLE 1

Logical-to-Physical Mapping

| Logical Volume | Disk Device |
|---|---|
| 1 | 1, 3, 5, 7 |
| 2 | 2, 4, 6, 8 |
| 3 | 1 |
| 4 | 3, 8 |
| 5 | 2, 7 |
| . | . |
| . | . |
| . | . |
| $L_i$ | $\{D_j\}$ |

TABLE 2

Physical-to-Logical Mapping

| Disk Device | Logical Volumes |
|---|---|
| 1 | 1, 3, . . . |
| 2 | 2, 5, . . . |
| 3 | 1, 4, . . . |
| . | . |
| . | . |
| . | . |
| $D_j$ | $\{L_i\}$ |

In the above example, logical volumes 1, 4 and 5 appear on multiple disk drives 20 due to a parity or replication configuration as referred to above.

Figure 2:
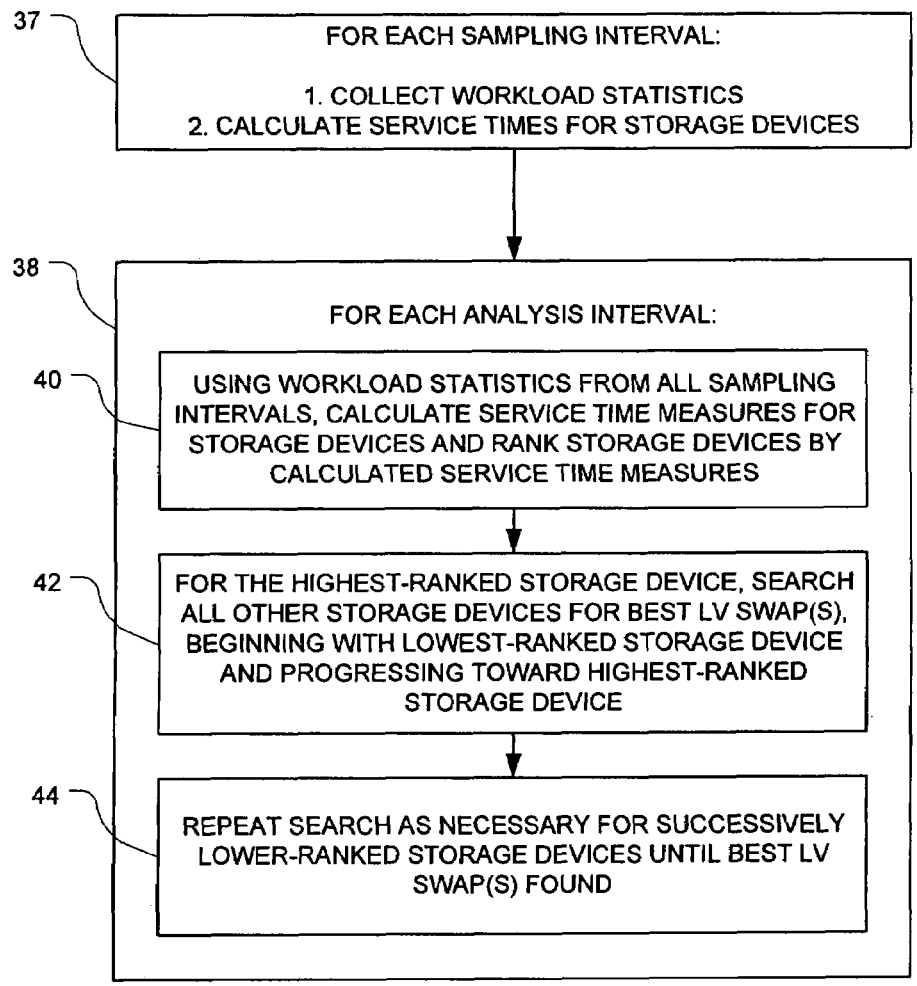
FIG. 2 is a flow diagram of a process for performing an exhaustive search for logical volume swaps in a data storage system.

FIG. 2 shows the operation of the analyzer program component 32 of FIG. 1. Two distinct operational phases are shown. In a first phase, step 37 is performed once for each of a number of sampling intervals. In one embodiment, the sampling intervals are on the order of 10 minutes long. Shorter or longer sampling intervals are possible in alternative embodiments. Shorter intervals are generally preferred for improved accuracy of the analyzer 32, while longer intervals tend to reduce the processing burden created by the analyzer 32. In a second operational phase, a set of steps 38 is performed at much longer "analysis intervals", for example one week. Again, other intervals are possible.

In step 37, the service processor 24 collects statistics regarding the workload of the storage devices 20 on a per-logical-volume basis. These workload statistics are stored as part of the data 34 in the memory 28 of the service processor 24. Due to the presence of the cache memory in the cache and interconnect block 14, the workload experienced by the storage devices 20 is generally different from the workload presented by the hosts. Host read requests that hit in the cache, for example, do not result in requests to the storage devices 20. On the other hand, the cache generates pre-fetches of data from the storage devices 20 that may never be used to satisfy a host read request. Thus, the specific workload of the storage devices 20 that is monitored includes the following transactions:

Host Read Misses
Host Writes
Prefetches

For each logical volume 36 that is involved in one of the above transactions during a sampling interval, the disk adapters 16 record (1) the number of such transactions, and (2) the size (i.e. the amount of data transferred) of each transaction. For all other logical volumes, a transaction count of zero is recorded. This statistics-collection process is repeated during each sampling interval.

The service processor 24 then uses the workload statistics to calculate a service time for each of the storage devices 20 based on the actual present mapping of logical volumes 36 to physical storage devices 20. The calculated service times are stored as part of the data 34 in the memory 28 of the service processor 24. The computation of service times employs a model that reflects three primary components of delay or service time in reading or writing data to/from a storage device: seek time, rotational delay, and data transfer time. The average rotational delay experienced for each transaction is estimated at ⅓ of the disk revolution period. The data transfer time is a function of the size of the data transfer, the bit density and revolution rate of the disk. These factors are applied to each transaction to arrive at a transfer time for the transaction. The transfer time is added to the rotational delay for each transaction. Then, for each storage device 20, the summed values for all transactions involving any of the logical volumes on that device are added together. The result represents the total rotational delay and transfer time for the storage device 20 over the sampling interval.

Seek time is calculated using a model that incorporates a set of predetermined seek time constants for each pair of logical volumes 36 on each storage device 20. Each seek time constant represents the time required for a seek when an access to one logical volume of the pair is followed by an access to the other logical volume of the pair. The set of seek time constants can be obtained from the manufacturer of the storage device 20, or they can be obtained empirically. The seek time constants are combined with a set of weighted transaction counts for each volume, where the weighting reflects differences among the transaction types from a device loading perspective. For example, prefetches and writes are usually more sequential in nature than read-misses, and therefore result in fewer seeks. Thus, read-misses are weighted more heavily than writes and prefetches. In one weighting scheme, the weighted transaction count for a logical volume over a sampling interval is calculated as the sum of (read misses)+½(writes)+ ¼(prefetches).

The total seek time for a given storage device 20 over a sampling interval is then calculated (in accordance with one model) as follows:

$$T(\text{seek})=(\text{SUM}(T_{ij}*A_i*A_j))/(\text{SUM}(A_k))$$

where the SUM in the numerator is over all pairs of logical volumes i and j, Tij is the predetermined seek time constant for the pair of logical volumes i and j, and Ai and Aj are the weighted transaction counts for same pair of logical volumes. The SUM in the denominator is the sum of all weighted transaction counts for all the logical volumes 36 on the storage device 20.

For each storage device 20, the value T(seek) is added to the values obtained for total rotational delay and data transfer time to arrive at the service time for the storage device 20 for the sampling interval.

Referring again to FIG. 2, a set of steps 40-44 are performed in each analysis interval. In step 40 the service processor 24 calculates service time measures for the storage devices 20 from the service times calculated during each sampling interval. This operation involves adding together the service times for each storage device over all the sampling intervals to arrive at a service time measure for the storage device. Once the service time measures for all the storage devices 20 have been calculated, the storage devices 20 are then ranked according to the calculated service time measures. An example of such a ranking is shown in the bar chart of FIG. 3, where the x-axis numbers are arbitrary storage device identifiers and the y-axis height of each bar represents the magnitude of the calculated service time measure for the corresponding device.

Returning to FIG. 2, in step 42 the service processor 24 searches for one or more best swaps of logical volumes (LV) 36 involving the highest-ranked storage device 20 (i.e., a swap of a logical volume on the storage device 20 having the greatest service time measure with a logical volume on some other storage device 20). The number of swaps to be searched for can be a fixed or user-specified parameter of the search, and may be one or some number greater than one. It is generally unnecessary to search for more swaps than will actually be carried out during a given analysis interval.

As shown, the search for best swaps begins with the lowest-ranked storage device 20, i.e., the storage device having the lowest service time measure, and progresses toward the highest-ranked storage device 20. The goal is to find swaps that reduce the service time measure of the highest-ranked storage device 20 without unduly increasing the service time measure of another storage device 20, such that overall system performance is improved. During this process, the service processor 24 selects specific logical volumes 36 for potential swapping between the highest-ranked storage device 20 and another storage device 20, beginning with the lowest-ranked storage device 20. In one approach, the logical volumes 36 on each storage device 20 are ranked according to their weighted transaction counts as determined above. The logical volumes 36 of the highest-ranked device 20 are considered in order from highest-ranked to lowest-ranked, while the logical volumes of the other storage device (e.g., the lowest-ranked storage device 20) are considered in order from lowest-ranked to highest-ranked.

At the completion of step 42, some number of best LV swaps involving the highest-ranked storage device 20 have been identified. In some cases, this number may be zero or some non-zero number that is less than a desired minimum number of swaps to be identified. In such a case, the searching for swaps continues for successively lower-ranked storage devices 20 as shown at step 44 until either the desired number of swaps have been found or all possible swaps have been considered.

As mentioned above, as the number of storage devices 20 in the storage system component 19 grows, so does the requirement for processing resources to carry out the exhaustive searching of FIG. 2. For a given quota of processing resources, such as overall allocated computation time on the service processor 24, the process of FIG. 2 may not be able to successfully find the desired number of best swap(s) for the highest-ranked storage device 20. Such a situation is very undesirable.

Figure 4:
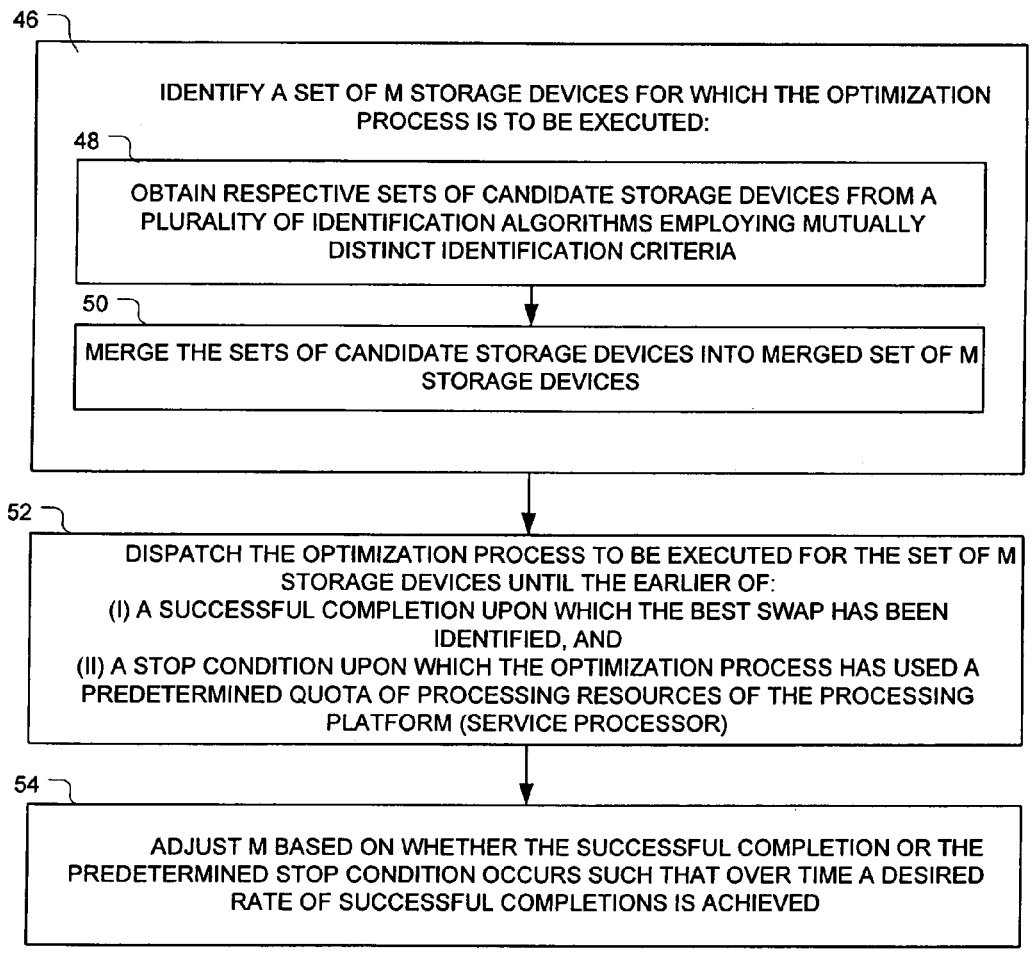
FIG. 4 is a flow diagram of a process for identifying a set of storage devices and dispatching an optimization analysis process to be executed with respect to the set of storage devices in accordance with the present invention.

FIG. 4 shows a process in which the execution of an optimization analysis process like that of FIG. 2 is controlled to improve its effectiveness when there are more storage devices 20 than can be exhaustively analyzed within limited processing time. As described below, the service processor 24 selects a subset of the storage devices 20 that are good candidates for performance-improving swaps, and then executes the full optimization analysis process on this subset of storage devices 20. It will be appreciated that this approach cannot guarantee that the globally best swap(s) have been found during a given analysis interval, because the storage device(s) 20 for which such best swap(s) exist may not be within the selected subset. However, if the subset is selected properly, the system performance improvements attainable by this method can be comparable to those attainable when the full optimization analysis process is executed with respect to the entire set of storage devices 20.

The service processor 24 executes the process of FIG. 4 once per analysis interval, which as described above may be on the order of one week. Shorter or longer analysis intervals are of course possible.

In the first step 46 of FIG. 4, a set of M storage devices 20 is identified for which the full optimization analysis process is to be executed. In general, M can be any value up to the entire number of storage devices 20 within the storage system component 19. As described below, M is automatically adjusted to a value or range of values as necessary to keep the execution time of the overall process within some predetermined limit, such as one hour for example. A convenient initial value for M (for example upon re-configuring the storage system component 19 or some other initial operating state) is the total number of storage devices 20 within the storage system component 19.

Step 46 includes step 48 in which the service processor 24 identifies respective sets of candidate storage devices 20 using multiple identification algorithms that employ different identification criteria. In one such algorithm described below, a "swap score" is assigned to some or all of the storage devices 20, and the storage devices 20 are then ranked according to their swap scores. Some predetermined number of the highest-ranked and lowest-ranked storage devices 20 (according to the swap scores) are then selected.

Figure 3:
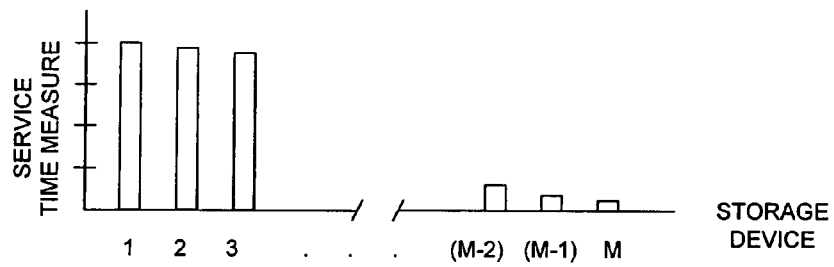
FIG. 3 is a bar chart depicting service times for a plurality of storage devices in the data storage system of FIG. 1.

In a second identification algorithm, the service processor 24 selects a predetermined number of the highest-ranked and lowest-ranked storage devices 20 according to the service time ranking of FIG. 3. This identification algorithm has the benefit of simplicity, given that the ranking of FIG. 3 is already required for execution of the optimization analysis process. However, this algorithm may not always yield the best storage devices 20 for swaps. It may be, for example, that the logical volumes on one or more of these devices are not swappable for any of a variety of reasons, which can include size limitations, protection-related limitations, or user-imposed limitations. Thus, this second identification algorithm is preferably used only in conjunction with other identification algorithms that employ other identification criteria, such as the swap scoring discussed above.

In a third identification algorithm, the service processor 24 selects some number of storage devices 20 at random. The presence of a random element in the identification process is desirable to avoid operating states in which the best swap(s) is/are systematically not considered due to the nature of the identification criteria used by the other identification algorithms. This prevents the persistent under-optimization of the storage system with respect to the placement of logical volumes.

It will be appreciated that other identification algorithms may be employed to identify sets of candidate storage devices 20.

After the service processor 24 has identified sets of candidate storage devices 20 by the various identification algorithms in step 48, it merges these sets into a final set of M storage devices in step 50. Merging may be accomplished in a variety of ways, and may to some extent be dependent on the identification results. As an example, let it be assumed that M=80 storage devices 20 are to be selected from among 200 storage devices 20 within the storage system component 19, and that the above three identification algorithms are utilized. If each set of candidate storage devices 20 from the various identification algorithms has at least one-third of eighty (i.e., 27) storage devices 20, then that number is taken from each set. If one or more of the sets has fewer than 27 storage devices 20, then more can be taken from another set or sets. If, because of overlaps between the sets of candidates, the resulting selection is smaller than 80, then additional candidates can be chosen from one or more of the sets. In alternative embodiments, it may be desirable to take different proportions from the different sets, such as 60% from one, 30% from a second, and 10% from a third. The proportions may be fixed or varied over time. Because of the desirability of some degree of randomness, it is preferable that some number of randomly selected storage devices 20 be included in the final set of M storage devices 20.

Once the set of M storage devices 20 has been identified, then in step 52 the service processor 24 performs the full optimization analysis process (such as described above with reference to FIG. 2) on this identified set of storage devices. This operation can be the same as described above, except that only the set of M storage devices 20 are involved rather than all the storage devices 20 of the storage system component 19. The optimization analysis process is run until either (1) it completes successfully by identifying the one or more best swap(s) for the set of M devices, or (2) it reaches a stop condition indicating that it has utilized some predetermined quota of processing resources of the service processor 24. One quota that may be used is a limit on overall process execution time (such as one hour as mentioned above), although other quotas (such as number of input/output transactions, memory consumption, etc.) may be utilized either in addition to or instead of execution time. When a successful completion occurs, it is an indication that the optimization analysis process has been allocated sufficient processing resources to analyze at least M storage devices 20, whereas the occurrence of the stop condition indicates the opposite—that the set size M is too large for the optimization analysis process to perform the full analysis within the allocated processing resource quota.

In step 54, the service processor 24 adjusts M based on how step 52 completed. If the stop condition was encountered, then M is decreased by a first predetermined amount, such that a smaller set of storage devices 20 will be analyzed in the next iteration of the optimization analysis process. Otherwise, M is increased by a second predetermined amount, up to the entire number of storage devices 20 within the storage system component 19. The increase/decrease values may be predetermined or may be dependent on the execution of step 52. For example, the decrease value may be related to the number of storage devices 20 that are successfully analyzed before the stop condition occurs. The closer the number is to M, then the smaller the amount of decrease for the next iteration. It is generally desirable that the increase and decrease amounts be different in order to avoid instability in the processing. For example, if the increase amount is 10%, for example, then the decrease amount might be 5%. However the increase and decrease values are selected, the goal is that over time some desired rate of successful completions occurs, indicating that the allocated processing resources are being used effectively. As an example, a successful completion rate in the range of ½ to ⅓ might be desirable in one embodiment, where "1/N" means one successful completion per N iterations of the process of FIG. 4.

Figure 5:
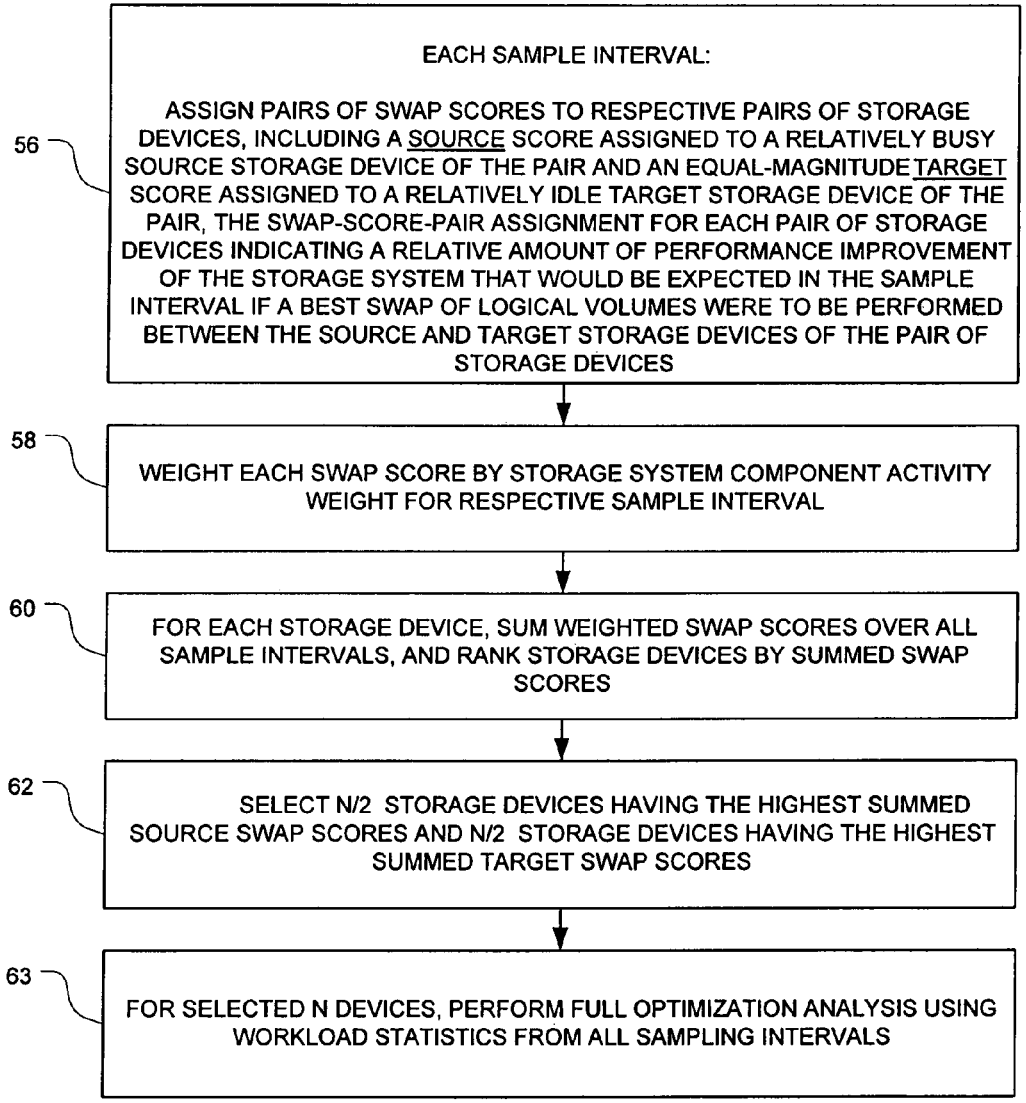
FIG. 5 is a flow diagram of an identification process for selecting a candidate set of storage devices according to swap scoring as part of the process of FIG. 4.
Figure 6:
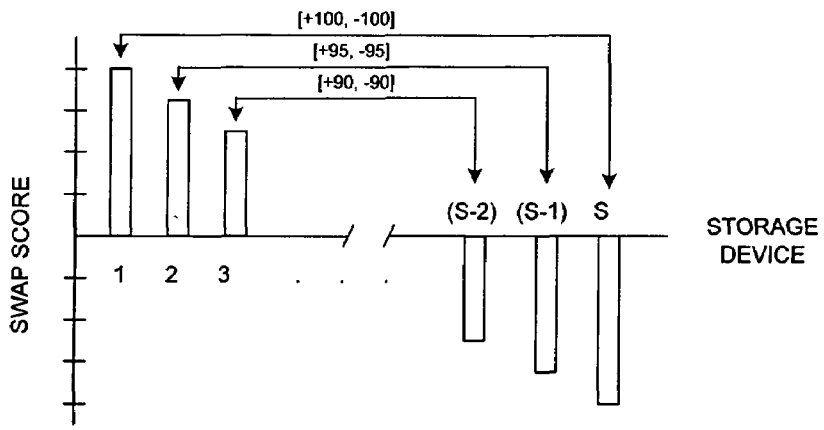
FIG. 6 is a bar chart depicting swap scores for a plurality of storage devices in the data storage system of FIG. 1.

FIG. 5 illustrates the "swap scoring" algorithm referred to above for identifying candidate storage devices in step 48 of the process of FIG. 4. The service processor 24 executes step 56 once per sample interval based on the workload statistics gathered during the sample interval as described above with reference to FIG. 2. In step 56, the optimization analysis process of FIG. 2 is performed based on only the workload statistics from the current sample interval. The swaps that are identified during the optimization analysis process are ranked according to the amount of system performance improvement that would have been expected in the sample interval if the respective logical volumes had been swapped. Each swap is associated with a "source" (relatively busy) device 20 and a "target" (relatively idle) device 20 on which the logical volumes of the swap are stored. In one approach illustrated in FIG. 6, swap scores are assigned in pairs such as [+100, −100], [+95, −95], etc., where the two scores of each pair are assigned to the source and target devices respectively that are associated with the swap. In FIG. 6, source devices appear toward the left, and target devices toward the right. It will be noted that the variable S is used to denote the number of ranked devices, which in general is different from the value M appearing in the process of FIG. 4.

Referring again to FIG. 5, in step 58 the services processor 24 weights the swap scores from each sample interval according to the overall activity of the storage system component 19 for the interval. The general goal here is to give more weight to those scores occurring during relatively busy periods, on the assumption that the underlying swaps will generally have a greater overall performance impact than swaps that score commensurately during relatively idle periods. In one embodiment, an activity weight $A_i$ is calculated for each sample interval, and then each swap score is multiplied by the corresponding activity weight divided by the sum of all activity weights over the analysis interval:

Total activity $T=\Sigma A_i$ (Weighted swap score)$_i$=(raw swap score)$_i$*$(A_i/T)$ In the above calculation, each activity weight $A_i$ is the above-described weighted transaction count (e.g., (read misses)+½(writes)+¼(prefetches)) occurring in the storage system component 19 during the sample interval.

In step 60 of FIG. 5, the service processor 24 sums the weighted swap scores for each storage device 20 over all the sample intervals. The devices are then ranked again, but this time by summed swap scores rather than the per-interval swap score. Then in step 62 some number N of these storage devices (N/2 of the highest-ranked and N/2 of the lowest-ranked) are selected as the set of candidate storage devices 20 identified by the swap score algorithm for eventual merging into the final set of M storage devices. In step 63, these N devices are subject to the full optimization analysis of FIG. 2 using the workload statistics gathered over all sample intervals of the analysis interval. Thus, only potential swaps from these N devices are evaluated, rather than all potential swaps from among all the devices 20 of the storage system component 19. The processing burden of the optimization process is correspondingly reduced. Generally, N is selected to achieve a desired balance between the accuracy of the resulting optimization (improves with higher N) and the processing burden of the optimization process (diminishes with lower N). As an example, N may be on the order of 10-20% of the total number of storage devices 20 within the storage system component 19. As mentioned above, the processing burden is roughly proportional to the square of the number of storage devices 20, and thus the processing burden can be reduced by 95% or more without unduly sacrificing accuracy.

Figure 7:
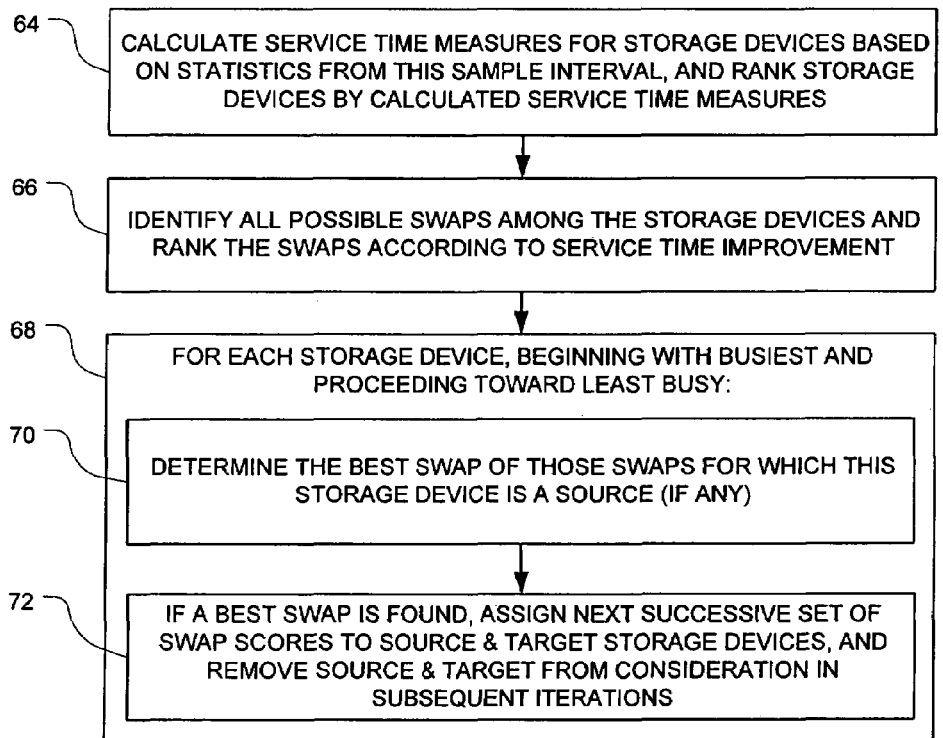
FIG. 7 is a flow diagram of processing performed in each sample interval as part of the swap-score-based selection process of FIG. 5.

FIG. 7 shows the per-sample-interval swap scoring step 56 of the process of FIG. 5 in more detail. In step 64, the service processor 24 calculates service time measures for all the storage devices 20 based on the statistics gathered during the sample interval, and the storage devices 20 are ranked according to their service time measures. In step 66, all possible swaps of logical volumes among the storage devices 20 are identified and ranked according to the improvement of service time that would be expected. Step 68 includes steps 70 and 72 which are repeated for each storage device 20, beginning with the busiest and proceeding toward the least busy. In step 70, it is determined whether there is at least one swap involving the storage device as a source, and the best of such swaps is identified. If at least one swap is found, then in step 72 the next set of swap scores are assigned to the storage device (as source) and the target storage device. These two storage devices are then removed from the consideration for subsequent iterations, i.e., neither of these storage devices is considered in subsequent executions of step 66 during the sample interval. The "next set" of scores refers to the next pair of scores from the above-described progression. Utilizing the above example, the first set of scores to be assigned is [+100, −100], the next set is [+95, −95], etc. Upon completion of the process of FIG. 7, swap scores for the interval are assigned to some or all of the storage devices 20.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of improving performance of a storage system having a plurality of storage devices on which logical volumes are stored, the method comprising repeated executions of an optimization dispatch process and an optimization analysis process on a processing platform, each execution of the optimization analysis process including a search for a corresponding best swap of logical volumes among an identified set of the storage devices according to a predetermined performance criteria, each execution of the optimization dispatch process comprising:
   (A) identifying a set of M storage devices for which the optimization analysis process is to be executed, including (i) obtaining respective sets of candidate storage devices from a plurality of identification algorithms employing mutually distinct identification criteria, and (ii) merging the sets of candidate storage devices;
   (B) dispatching the optimization analysis process to be executed for the set of M storage devices until an earlier of (i) a successful completion upon which the best swap has been identified, and (ii) a stop condition upon which the optimization analysis process has used a predetermined quota of processing resources of the processing platform; and
   (C) adjusting M for a subsequent execution of the optimization dispatch and optimization analysis processes based on whether the successful completion or the predetermined stop condition occurs, M being adjusted such that over time a desired rate of successful completions is achieved.

2. A method according to claim 1, wherein the identification algorithms include random selection from among the storage devices.

3. A method according to claim 1, wherein the identification algorithms include a swap scoring algorithm comprising:
   in each of a plurality of sample intervals, assigning pairs of swap scores to respective pairs of the storage devices, each swap-score-pair assignment indicating a relative amount of performance improvement of the storage system that would be expected in the sample interval if a best swap of logical volumes were performed between source and target storage devices of the pair of storage devices;
   weighting the per-sample-interval swap scores according to respective levels of activity of the storage system;
   summing the weighted swap scores for each storage device over the sample intervals and ranking the storage devices by the summed swap scores; and
   selecting a predetermined number of an highest-ranked and lowest-ranked storage devices.

4. A method according to claim 1, wherein the stop condition indicates that a predetermined limit on execution time of the optimization analysis process has been reached.

5. A method according to claim 1, wherein adjusting M comprises:
   increasing M by a first amount if the successful completion occurs; and
   decreasing M by a second amount if the stop condition occurs.

6. A method according to claim 5, wherein the first amount is not equal to the second amount.

7. A service processor comprising a processor, memory and an input/output interface, the input/output interface being coupleable to a set of device controllers of a storage system having storage devices on which logical volumes are stored according to an actual mapping, the memory being operative to store an optimizer program component executable by the processor, the optimizer program component including an optimization dispatch program component and an optimization analysis program component, the processor being operative when executing the optimization dispatch program component to perform repeated executions of an optimization dispatch process and an optimization analysis process, each execution of the optimization analysis process including a search for a corresponding best swap of logical volumes among an identified set of the storage devices according to a predetermined performance criteria, each execution of the optimization dispatch process comprising:

(A) identifying a set of M storage devices for which the optimization analysis process is to be executed, including (i) obtaining respective sets of candidate storage devices from a plurality of identification algorithms employing mutually distinct identification criteria, and (ii) merging the sets of candidate storage devices;

(B) dispatching the optimization analysis process to be executed for the set of M storage devices until an earlier of (i) a successful completion upon which the best swap has been identified, and (ii) a stop condition upon which the optimization analysis process has used a predetermined quota of processing resources of the service processor; and (C) adjusting M for a subsequent execution of the optimization dispatch and optimization analysis processes based on whether the successful completion or the predetermined stop condition occurs, M being adjusted such that over time a desired rate of successful completions is achieved.

8. A service processor according to claim 7, wherein the identification algorithms include random selection from among the storage devices.

9. A service processor according to claim 7, wherein the identification algorithms include a swap scoring algorithm comprising:

in each of a plurality of sample intervals, assigning pairs of swap scores to respective pairs of the storage devices, each swap-score-pair assignment indicating a relative amount of performance improvement in the storage system that would be expected in the sample interval if a best swap of logical volumes were performed between source and target storage devices of the pair of storage devices;

weighting the per-sample-interval swap scores according to respective levels of activity of the storage system;

summing the weighted swap scores for each storage device over the sample intervals and ranking the storage devices by the summed swap scores; and selecting a predetermined number of a highest-ranked and lowest-ranked storage devices.

10. A service processor according to claim 7, wherein the stop condition indicates that a predetermined limit on execution time of the optimization analysis process has been reached.

11. A service processor according to claim 7, wherein adjusting M comprises:

increasing M by a first amount if the successful completion occurs; and decreasing M by a second amount if the stop condition occurs.

12. A service processor according to claim 11, wherein the first amount is not equal to the second amount.

13. A storage system, comprising:

a plurality of storage devices on which logical volumes are stored according to an actual mapping;

a set of device controllers operative to:
(A) collect workload statistics for the logical volumes for each of a plurality of sampling intervals; and
(B) copy logical volumes among the storage devices as part of swap operations; and a service processor operative to perform repeated executions of an optimization dispatch process and an optimization analysis process, each execution of the optimization analysis process including a search for a corresponding best swap of logical volumes among an identified set of the storage devices according to a predetermined performance criteria, each execution of the optimization dispatch process including:

(A) identifying a set of M storage devices for which the optimization analysis process is to be executed, including (i) obtaining respective sets of candidate storage devices from a plurality of identification algorithms employing mutually distinct identification criteria, and (ii) merging the sets of candidate storage devices;

(B) dispatching the optimization analysis process to be executed for the set of M storage devices until an earlier of (i) a successful completion upon which the best swap has been identified, and (ii) a stop condition upon which the optimization analysis process has used a predetermined quota of processing resources of the service processor; and (C) adjusting M for a subsequent execution of the optimization dispatch and optimization analysis processes based on whether the successful completion or the predetermined stop condition occurs, M being adjusted such that over time a desired rate of successful completions is achieved.

14. A computer program storage medium on which an optimizer program is stored, the optimizer program including an optimization dispatch program component and an optimization analysis program component, the optimizer program component being operative when executed by a processor in a storage system to perform repeated executions of an optimization dispatch process and an optimization analysis process, each execution of the optimization analysis process including a search for a corresponding best swap of logical volumes among an identified set of storage devices in a storage system according to a predetermined performance criteria, each execution of the optimization dispatch process comprising:

(A) identifying a set of M storage devices for which the optimization analysis process is to be executed, including (i) obtaining respective sets of candidate storage devices from a plurality of identification algorithms employing mutually distinct identification criteria, and (ii) merging the sets of candidate storage devices;

(B) dispatching the optimization analysis process to be executed for the set of M storage devices until an earlier of (i) a successful completion upon which the best swap has been identified, and (ii) a stop condition upon which the optimization analysis process has used a predetermined quota of processing resources of the service processor; and (C) adjusting M for a subsequent execution of the optimization dispatch and optimization analysis processes based on whether the successful completion or the predetermined stop condition occurs, M being adjusted such that over time a desired rate of successful completions is achieved.

* * * * *